United States Patent
Togo

(10) Patent No.: US 8,472,048 B2
(45) Date of Patent: Jun. 25, 2013

(54) JOB CONTROL METHOD, COMPUTER READABLE MEDIUM, AND JOB CONTROL SYSTEM

(75) Inventor: Atsushi Togo, Kanagawa (JP)

(73) Assignee: Fuji Xerox, Co., Ltd., Tokyo (JP)

( * ) Notice: Subject to any disclaimer, the term of this patent is extended or adjusted under 35 U.S.C. 154(b) by 1135 days.

(21) Appl. No.: 12/405,806

(22) Filed: Mar. 17, 2009

(65) Prior Publication Data
US 2010/0027053 A1 Feb. 4, 2010

(30) Foreign Application Priority Data
Jul. 29, 2008 (JP) ................................ 2008-195191

(51) Int. Cl.
*G06F 3/12* (2006.01)
*G06F 9/46* (2006.01)

(52) U.S. Cl.
USPC ......... 358/1.15; 358/1.18; 718/100; 718/102; 718/106

(58) Field of Classification Search
None
See application file for complete search history.

(56) References Cited

U.S. PATENT DOCUMENTS
2007/0195370 A1* 8/2007 Suga et al. ............. 358/1.18

FOREIGN PATENT DOCUMENTS
| JP | A-2006-99330 | 4/2006 |
| JP | A-2007-87322 | 4/2007 |
| JP | A-2007-164224 | 6/2007 |
| JP | A-2007-179533 | 7/2007 |
| JP | A-2007-280181 | 10/2007 |

OTHER PUBLICATIONS

Mar. 2, 2010 Office Action issued in Japanese Patent Application No. 2008-195191 (with translation).

* cited by examiner

*Primary Examiner* — King Poon
*Assistant Examiner* — Vincent Peren
(74) *Attorney, Agent, or Firm* — Oliff & Berridge, PLC

(57) ABSTRACT

A job control method includes: acquiring, from electronic information accepted, set information set for each setting item contained in the electronic information; setting the set information, which is acquired in the acquiring step, for an usable state in the job within a job item contained in a plurality of job items whose executing procedure are preset, the plurality of job items including a first job item and a second job item; and changing the set information, which is used in the job within a first job item, into an unusable state in the job within a second job item to be executed after the first job item has been executed.

7 Claims, 14 Drawing Sheets

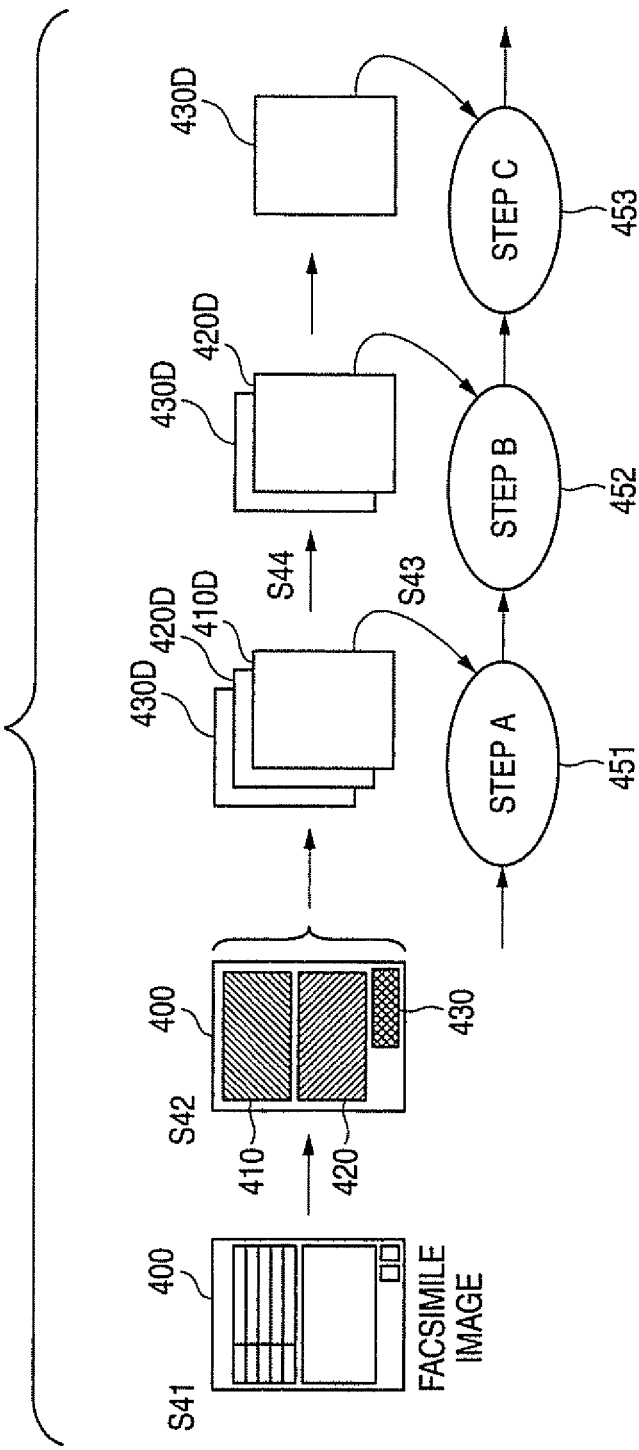

FIG. 5

```
400
┌─────────────────────────────────────┐
│ QUOTE REQUEST (FAX)                 │
│  ┌──────────────┬──────────────────┐│
│  │ NAME         │ SUZUKI TAROU     ││ 410
│  ├──────────────┼──────────────────┤│
│  │ KANA READING │ SUZUKI TAROU     ││
│  ├──────────────┼──────────────────┤│
│  │ TYPE         │ type A           ││
│  ├──────────────┼──────────────────┤│
│  │ OPTION       │ option A, option B││
│  ├──────────────┼──────────────────┤│
│  │ ML           │ no               ││
│  └──────────────┴──────────────────┘│
│                                     │
│     DESCRIBE IF THERE IS ANYTHING   │ 420
│                                     │
│        ~~~~~~~~~~~~~~~~~~~          │
│        ~~~~~~~~~~~~~~~~~~~          │
│        ~~~~~~~~~~~~~~~~~~~          │
│                                     │
│                  ┌─────────┬───────┐│
│                  │SEALING 1│SEALING 2││
│                  └─────────┴───────┘│
└─────────────────────────────────────┘
                       431       432
```

| | | |
|---|---|---|
| 601 — | UNDETERMINED EDITED INFORMATION ID | Mikakutei001 |
| 602 — | REGISTER | User A |
| 603 — | ORIGINAL DOCUMENT ID | Document Z |
| 604 — | EDITIN LIST | [ARRANGEMENT OF EDITED INFORMATION] |

600

| | | |
|---|---|---|
| 701 — | EDITED INFORMATION ID | Edit001 |
| 702 — | EDITOR | User A |
| 703 — | ORIGINAL DOCUMENT ID | Document Z |
| 704 — | EDITED AREA | ITEM = DocumentZ.inputForm001 |
| 705 — | CONTENT ID | Tegaki_content001 |

700

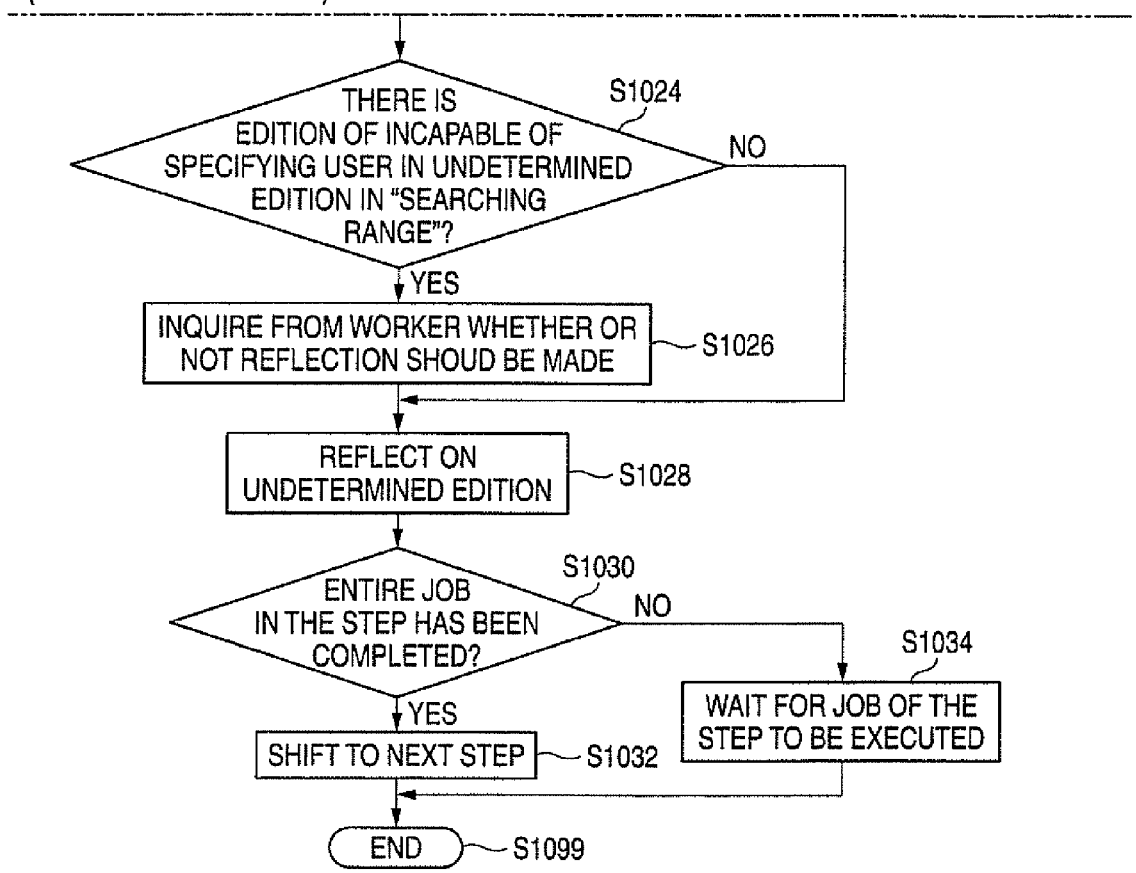

FIG. 15

| | | |
|---|---|---|
| 1501 | UNDETERMINED EDITED INFORMATION ID | Mikakutei001 |
| 1502 | REGISTER | User A |
| 1503 | ORIGINAL DOCUMENT ID | Document Z |
| 1504 | EDITION LIST | [ARRANGEMENT OF EDITED INFORMATION] |

| | | |
|---|---|---|
| 1601 | EDITED INFORMATION ID | Edit001 |
| 1602 | EDITOR | User A |
| 1603 | ORIGINAL DOCUMENT ID | Document Z |
| 1604 | PAGE | 1 |
| 1605 | COORDINATE, WIDTH, LENGTH | (50, 50), 250, 50 |
| 1606 | CONTENT ID | Tegaki_content001 |

| | | 1700 |
|---|---|---|
| 1701 | STEP ID | Node001 |
| 1702 | STEP NAME | ENTRY OF FORM |
| 1703 | SUBSEQUENT STEP ID | Node002 |
| 1704 | JOB LIST | Job001 |
| 1705 | UNDETERMINED EDITED INFORMATION | "POINTER TO DATA" |

FIG. 18

| | | 1800 |
|---|---|---|
| 1801 | JOB ID | Job001 |
| 1802 | PERSON IN CHARGE OF JOB | User A |
| 1803 | WORKING STATE | COMPLETED |
| 1804 | COMPLETION CONDITION | ENTRY OF TARGET ITEM |
| 1805 | TARGET DOCUMENT | Document Z |
| 1806 | TARGET DOCUMENT TYPE | STYLE: Stylized_fax_form |
| 1807 | JOB TARGET ITEM | Stylized_fax_form.SignForm |

JOB CONTROL METHOD, COMPUTER READABLE MEDIUM, AND JOB CONTROL SYSTEM

CROSS-REFERENCE TO RELATED APPLICATIONS

This application is based on and claims priority under 35 U.S.C. 119 from Japanese Patent Application No. 2008-195191 filed Jul. 29, 2008.

BACKGROUND

1. Technical Field

This invention relates to a job control method, a computer readable medium, and a job control system.

2. Related Art

There is workflow managing software for managing the workflow which is a system as the flow of information or job related to a business. It has received attention as one of information technologies supporting BPR (Business Process Reengineering). As the case may be, it is used in cooperation with groupware, progress management software, etc.

For each of job items in conventional workflows, only an input item allotted to the job item (its input is permitted) could be inputted.

Where fetching is done using a paper form in such a conventional workflow, the processing of outputting the form onto paper and processing of scanning to fetch the value entered in the paper form by scanning must be individually done for each of the job items.

SUMMARY

According to an aspect of the present invention, a job control method includes: acquiring, from electronic information accepted, set information set for each setting item contained in the electronic information; setting the set information, which is acquired in the acquiring step, for an usable state in the job within a job item contained in a plurality of job items whose executing procedure are preset, the plurality of job items including a first job item and a second job item; and changing the set information, which is used in the job within a first job item, into an unusable state in the job within a second job item to be executed after the first job item has been executed.

BRIEF DESCRIPTION OF THE DRAWINGS

Exemplary embodiment of the present invention will be described in detail based on the following figures, wherein:

FIG. 4 is a view for explaining an example of processing of the workflow in a first processing example;

FIG. 5 is a view for explaining an example of electronic information accepted;

FIG. 15 is a view for explaining an exemplary data structure of an undetermined edited information table;

FIG. 16 is a view for explaining an exemplary data structure of an edited information table;

FIG. 17 is a view for explaining an exemplary data structure of a step management table;

FIG. 18 is a view for explaining an exemplary data structure of a job table;

DETAILED DESCRIPTION

Figure 1:
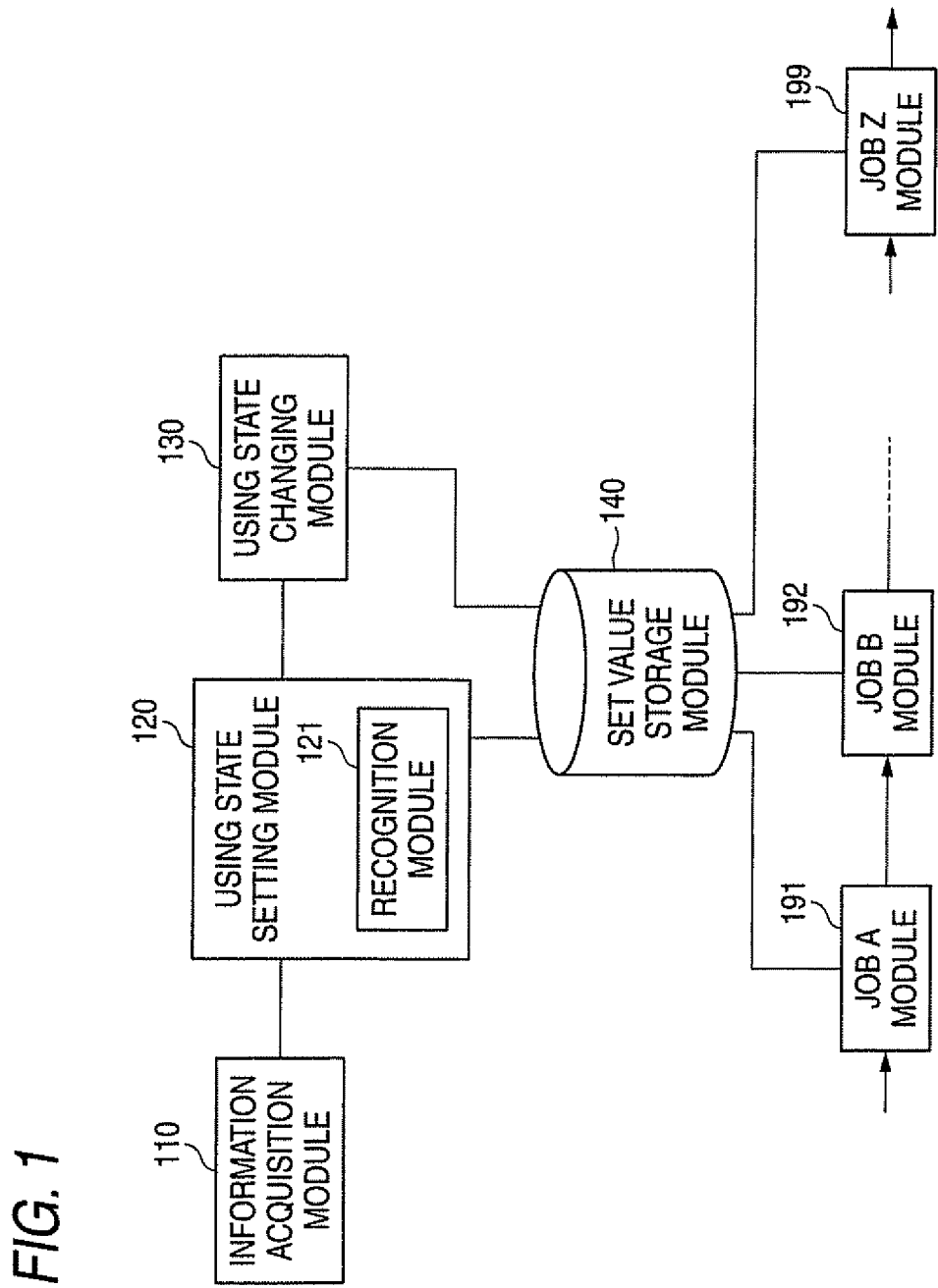
FIG. 1 is a conceptual module arrangement view of an embodiment of this invention.

Hereinafter, referring to the drawings, an explanation will be given of a preferred embodiment in realizing this invention.

FIG. 1 is a conceptual module arrangement view of an embodiment of this invention.

Incidentally, the module refers to a component such as pieces of software (computer program) and hardware generally logically separatable. Therefore, the module in this embodiment refers to not only the module in the computer program but also that in a hardware configuration. Thus, the explanation of this embodiment is directed to all the computer program, system and method. However, for convenience of explanation, although "store", "cause to store" and their similar words are used, their words mean, in the case of the computer program, that storing in a storage device or controlling to store therein is done by this embodiment. Further, the module and its function are in one-to-one correspondence. However, in packaging, a single module may be formed of one program; and a plurality of modules may be formed of one program. Inversely, a single module may be formed of plural programs. Further, plural modules may be executed by one computer; and a single module may be executed by plural computers which are in a scattering or parallel environment. Incidentally, a single module may include another module. Further, in the following description, "connection" refers to not only physical connection but also logical connection (data transmission/reception, instructions, reference relationship between data, etc.).

Further, "system or device" includes not only the case where plural computers, items of hardware, devices, etc. are connected by a communicating means such as a network (one-to-one communicating connection), but also are realized by a single computer, hardware, device, etc. The "device" and "system" will be used as the word having the same meaning. "Set" refers to "before target processing"; refers to not only before the processing by this embodiment is initiated, but also even if the processing by this embodiment is initiated, being determined according to the condition/status at this time or condition/status hitherto.

This embodiment, as shown by an example of FIG. 1, includes an information acquisition module 110, a using state setting module 120, a using state changing module 130, a set value storage module 140, and a job A module 191, a job B module 192, . . . a job Z module 199 which construct a workflow. The using state setting module 120 and using state changing module 130 manage the whole workflow or are accessed by the respective steps in the workflow (job A module 191, job B module 192, etc.).

Figure 2:
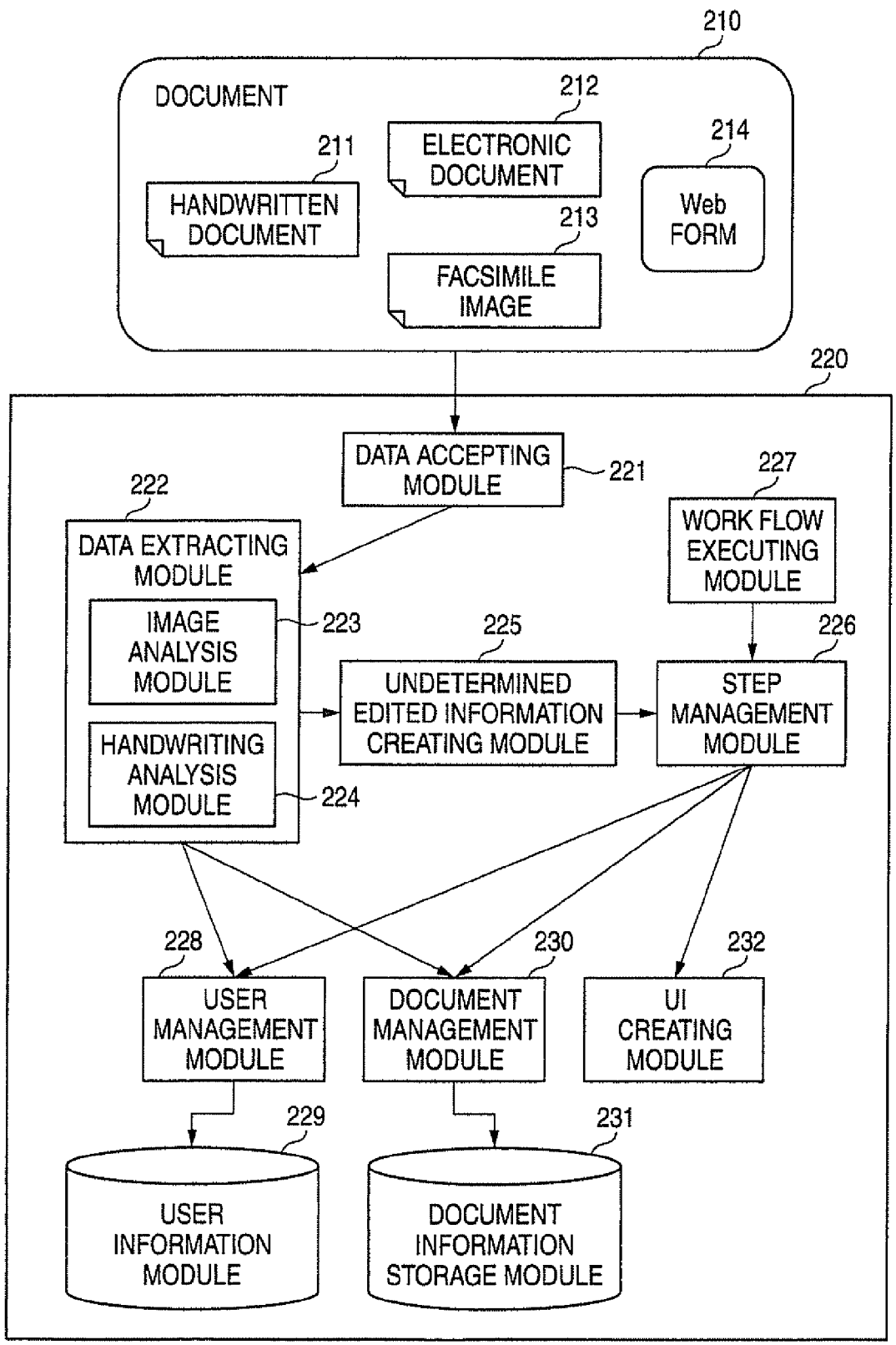
FIG. 2 is a view for explaining the entire system arrangement in realizing this embodiment.

It should be noted that the "workflow" is a generic name of the system of the flow of items of information and jobs relative to a business containing plural job items whose executing procedure is preset. Particularly, in a step management module 226 and a workflow executing module 227 as shown in FIG. 2, the workflow refers to, on the basis of the executing procedure for the jobs of the plural job items, specifying the job whose execution is permitted, executing this job, executing the job according to the operation of a worker as the case may be, and controlling these operations. The workflow may be a combination of modules such as groupware, a progress management, etc. Incidentally, the "job item" refers to activity (hereinafter referred to as "step") in the workflow, and the "job" refers to an actual job executed for each activity.

The information acquisition module 110, which is connected to a using state setting module 120, accepts electronic information and acquires set information set for each of setting items (hereinafter referred to as "items") contained in the electronic information accepted. The electronic information accepted contains series-of-jobs identifying information for identifying a series of jobs initiated according to plural job items (workflow) whose executing procedure are preset. It should be noted that the series-of-jobs identifying information does not refer to an identifier for the definition of the workflow but refers to that for a series of jobs actually started on the basis of the definition of the workflow. This information permits a plurality of the series of jobs to be started from the definition of a single workflow. The information acquisition module 110 delivers the set information acquired to the using state setting module 120. Additionally, the electronic information may be image information received by way of external equipment, by facsimile via a communication line.

The using state setting module 120 is connected to the information acquisition module 110, a using state changing module 130, a set value storage module 140 and incorporates a recognition module 121. The using state setting module 120 sets the set information acquired by the information acquisition module 110 for a state usable in the jobs within the job items contained in the workflow, and stores it for the set value storage module 140. At this time, the using state setting module 110 sets the set information in a state usable in the jobs in the job items in the series of jobs (workflow) specified by the series-of-jobs identifying information contained the electronic information accepted by the information acquisition module 110. Setting of the set information may be done using the recognition module 121. Namely, concerning the set information which a target for the recognition module 121, if the person recognized by the recognition module 121 agrees with the worker of the job item contained in the workflow, the set information is set to become the sate usable in the job within the pertinent job item. In order to more strictly specify the worker in the workflow, only when the person recognized agrees with the worker, the set information may be usable in the job within the pertinent job item. After the set information is set, control is shifted to the using state changing module 130. Further, the using state setting module 120 may start the job from not only the job of the first job item in the job A module 191, job B module 192, etc., but also from the job of any job item.

Where the electronic information accepted by the information acquisition module 110 is the image information, the recognition module 121, if the signature or print mark is extracted by the information set for each setting item, recognizes the person corresponding to the signature or print mark. Further, the person to be recognized by the recognition module 121, if the electronic information accepted by the information acquisition module 110 is text and others, includes a person to use the set information. Namely, within the electronic information accepted by the information acquisition module 110, the set information is correlated with the user. The recognition module 121 extracts the pertinent user.

The using state changing module 130, which is connected to the using state setting module 120 and the set value storage module 140, after the using state is set by the using state setting module 120, changes the set information stored in the set value storage module 140 and used for the job within certain job item (including setting job) into a state unusable in the jobs within other job items to be executed after the pertinent job item. For example, as a state not usable, a flag indicative of "unusable" canceling the set information is applied to the set information so that if there is no flag in each job, the set information can be used. Incidentally, "state not usable in the job in the job item" means limiting its use as the set information in the job according to the operation by a user for e.g. a form, but does not limit displaying of the set information.

The set value storage module 140 is accessed by the using state setting module 120, using state changing module 130, job A module 191, job B module 192, . . . , job Z module 199. It should be noted that "access" means that a computer executes read or write of data for the storage device (which includes a memory but not necessarily located with the computer). The set value storage module 140 stores the set information set by the using state setting module 120 (including the above series-of-jobs identifying information), which is changed by the using state changing module 130. Further, the set information is readout from the job A module 191 and others.

The job A module 191, job B module 192, . . . , job Z module 199, which are connected to the set value storage module 140, represent the respective jobs constituting the workflow (job is included in a step). For the job, the set information stored in the set value storage module 140 is used. Incidentally, in the example shown in FIG. 1, an arrow is marked so that processing is advanced from the job A module 191 to the job B module 192. However, according to setting of the workflow, a different order may be adopted. Further, connection among the respective steps may be not necessarily in one-to-one correspondence, for example, plural steps are connected to a single step, or the single step is connected to the plural steps.

FIG. 2 is a view for explaining the entire system arrangement in realizing this embodiment.

A workflow management system 220 includes a data accepting module 221, a data extracting module 222, a undetermined edited information creating module 225, a step management module 226, a workflow executing module 227, a user management module 228, a user information storage module 229, a document management module 230, a document information storage module 231 and a UI creating module 232.

An explanation will be given of the relationship with the modules shown in FIG. 1. The data accepting module 221 corresponds to the information acquisition module 110; the data extracting module 222, undetermined edited information creating module 225, user management module 228, user information storage module 229, document management module 230 and document information storage module 231 correspond to the using state setting module 120; an image analysis module 223 and a handwriting analysis module 224 correspond to the recognition module 121; and the step management module 226, user management module 228, use information storage module 229, document management module 230 and document information storage module 231 correspond to the using state changing module 130 and set value storage module 140. The workflow executing module 227 includes the job A module 191, job B module 192, . . . , job Z module 199.

The document 210 accepted by the data accepting module 221 includes a handwritten document 211, an electronic document 212, a facsimile image 213 and a Web form 214. Namely, the data accepting module 221 accepts the data such as a text and image. The data accepted are delivered to the data extracting module 222. Namely, the data accepting module 221 takes an input as an entry of registering data for the workflow. Incidentally, the series-of-jobs identifying information for specifying the workflow or its steps relative to the data accepted is previously designated or acquired from the data accepted. Further, the facsimile image 213 is the image information received by facsimile via the communication line; the facsimile may be connected to the workflow management system 220.

The data extracting module 222 is connected to the data accepting module 221, undetermined edited information creating module 225, user management module 228 and document management module 230, and includes the image analysis module 223 and handwriting analysis module 224.

The data extracting module 222 executes processing for the data delivered from the data accepting module 221 according to its format and delivers the resultant data to the undetermined edited information creating module 225, user management module 228 and document management module 230.

Specifically, where the data delivered from the data accepting module 221 are the data of text such as the electronic document 212 or Web form 214, the set information to be used in the workflow executing module 227 from the pertinent data is extracted. The set information is delivered to the undetermined edited information creating module 225 and document management module 230. Further, the operator which has entered the set information is specified and the operator is delivered to the user management module 228. Incidentally, the operator is specified by specifying the operator logged in when the set information is entered.

Where the format of the data delivered is the image such as the handwritten document 211 or facsimile image 213, the interior of the image is analyzed by the image analysis module 223 to extract a revision editing region and others. For example, from the form document already printed, the region revision-edited by handwriting is extracted. Thereafter, by the handwriting analysis module 224, the region revision-edited may be subjected to character recognition processing or the processing of specifying the user from the handwriting. Further, where the region revision-edited is a column of signature or sealing, the handwriting analysis module 224 recognizes the signer (operator) or sealing owner (operator). Incidentally, whether the region revision-edited is the column of signature or the column of sealing is done according to whether or not the position of the column of signature or the column of sealing previously stored in the form agrees with the region revision-edited. Further, as the set information, the result of the character recognition processing is delivered to the undetermined edited information creating module 225 and document management module 230, and the recognized user is delivered to the user management module 228. Further, where there is the information image such as a bar-code whose identifier is embedded in the image, the image analysis module 223 may analyze the image information to extract the identifier of the document. Further, the identifier of the operator as well as the identifier of the document may be embedded in the information image.

The undetermined edited information creating module 225 is connected to the data extracting module 222 and step management module 226. Using the set information received from the data extracting module 222, the undetermined edited information creating module 225 creates the set information necessary for the steps within the workflow and delivers the set information thus created to the step management module 226. Namely, the set information is created so as to correspond to the series-of-jobs in the workflow or in the steps within the workflow.

The step management module 226 is connected to the undetermined edited information creating module 225, workflow executing module 227, user management module 228, document management module 230, UI creating module 232. The step management module 226 manages the steps within the workflow for the workflow executing module 227. Further, the step management module 226 has a function of holding the undetermined set information received from the undetermined edited information creating module 225 and delivering the set information undetermined between the steps. Further, as occasion demands, in order to reflect the set information undetermined, the worker of the step may inquire the operator entered the pertinent set information via the user management module 228. Further, according to the job by the workflow executing module 227, the pertinent job may be reflected on the document within the document information storage module 231 via the document management module 230. For example, where the set information is set on the document by the workflow executing module 227, the job is reflected on the document of the document information storage module 231.

The workflow executing module 227, which is connected to the step management module 226, executes the job in each of the steps in the workflow.

The user management module 228 is connected to the data extracting module 222, step management module 226, user information storage module 229. According to the request from the data extracting module 222 and step management module 226, using the user information storage module 229, the user management module 228 manages the user. As occasion demands, the user management module 228 manages both the user and his handwriting.

The user information storage module 229 is accessed by the user management module 228 and stores the information necessary for user management. The user information storage module 229 stores e.g. the quantity of features of handwriting of a user and the quantity of features for recognizing a sealing stamp as well as a user name or password.

The document management module 230 is connected to the data extracting module 222, step management module 226 and document information storage module 231. The document management module 230 manages the documents stored in the document information storage module and contents undetermined. Where the set information undetermined is set by the workflow executing module 227, the document management module 230 functions to reflect the set information on the document. Where a stylized document is dealt with, the document management module 230 may manages the stylized document.

The document information storage module 231 is accessed by the document management module 230 and stores the documents necessary for the job of the workflow executing module 227.

The UI creating module 232 is connected to the step management module 226. The UI creating module 232 creates, on e.g. the display of the workflow management system 220, the user interface necessary when the job in the workflow is executed by the workflow executing module 227 and receives an instruction from an operator using a key board, mouse, etc.

Figure 3:
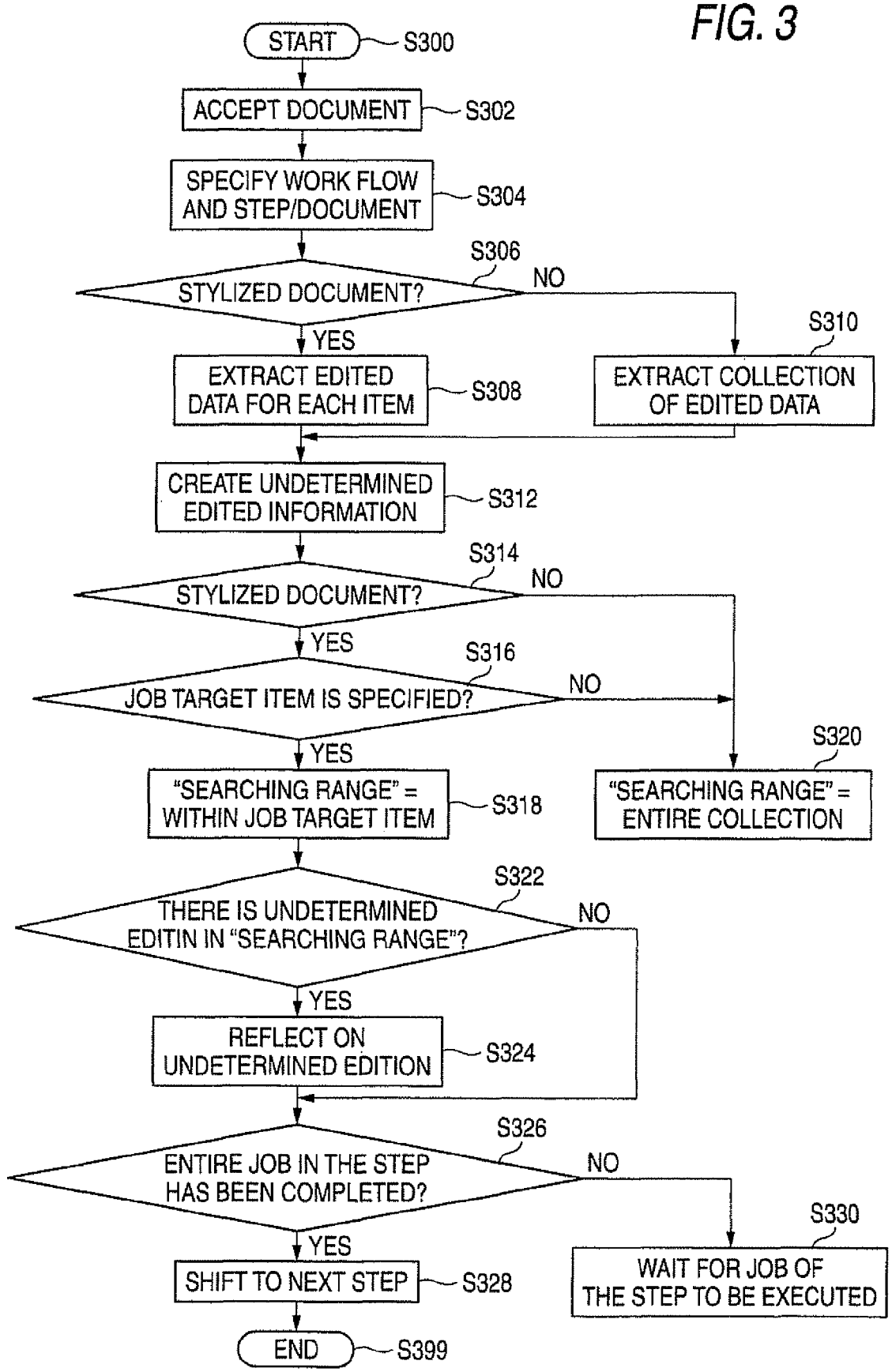
FIG. 3 is a flowchart of a first processing example according to this embodiment.

FIG. 3 is a flowchart showing a first processing example according to this embodiment.

In step S302, the information acquisition module 110 accepts a document 210 such as a facsimile image 213.

In step S304, using the identifier within the document accepted in step S302, the data extracting module 222 specifies the workflow, its steps and document 210.

In step S306, the data extracting module 222 determines if or not the document specified by step S304 is a stylized document. If the stylized document, the processing proceeds to step S308. If not, the processing proceeds to step S310. Whether or not the pertinent document is the stylized document is determined by the identifier.

In step S308, the data extracting module 222 extracts edited data of each of items within the document. Namely, since a target document is the stylized document, the items are predetermined, the edited data described for each item are extracted.

In step S310, the data extracting module 222 extracts a collection of the edited data within the document.

If the target document is the handwritten document 211 or facsimile image 213, in step S308 and step S310, the image analysis module 223 and handwriting analysis module 224 analyze the image to extract the edited data.

In step 312, the undetermined edited information creating module 225 creates the undetermined edited data which is set information on the basis of the edited data extracted in step S308 and S310.

In the processing from step S314 to S320, the undetermined edited information creating module 225 limits the searching range of the set information used in the setting job in the steps within the workflow from the target document.

In step S314, the undetermined edited information creating module 225 determines whether or not the document relative to the undetermined edited information created in step S312 is the stylized document. If the pertinent document is the stylized document, the processing proceeds to step S316. If not, the processing proceeds to step S320. Whether or not the pertinent document is the stylized document is determined by the identifier.

In step S316, the undetermined edited information creating module 225 determines whether or not a job target item has been set with in the target document. If the job target item has been set, the processing proceeds to step S318. If not, the processing proceeds to step S320.

In step S318, the undetermined edited information creating module 225 limits the searching range to the edited data (set information) within the job target item.

In step S320, the undetermined edited information creating module 225 defines the searching range in the entire collection of the edited data.

In the processing from step S322 to step S330, under the control by the step management module 226, the workflow executing module 227 executes the steps within the workflow. This execution includes setting the set information.

In step S322, the step management module 226 determines whether or not there are undetermined edited data in the searching range defined in step S318 or step S320. If there are the undetermined edited data in the searching range, the processing proceeds to step S324. If not, the processing proceeds to step S326.

In step S324, the step management module 226 reflects the edited data on undetermined editing job.

In step S326, the step management module 226 determines whether or not the job of the step to be executed by the workflow executing module 227 has been wholly completed. If completed, the processing proceeds to step S328. If not, the processing proceeds to step S330.

If step S328, the step management module 226 controls the processing so that the step is shifted to a next step within the workflow. If shifted, the undetermined edited data are handed over to the next step. Namely, the edited data used in the previous step are changed into such a state that they cannot be used in the setting job at the next step and handed over the next step. Now, "changing the edited data into a state unusable in the setting job at the next step" is e.g. to delete the edited data already used in the setting job, to add a flag indicative of being unusable to the edited data.

In step S330, the step management module 226 awaits execution of the job at the step by the worker.

FIG. 4 is a view for explaining an example of processing of the workflow in a first processing example. This example of the workflow includes step A 451, step B 452 and step C 453.

In step S41, the data accepting module 221 accepts a facsimile image 400. The facsimile image 400 will be explained with reference to an example shown in FIG. 5. The facsimile image 400 has a request information column 410, a memo column 420, a sealing column 431 and a sealing column 432.

In step S42, the data extracting module 222 executes image analysis of the facsimile image 400 using the image analysis module 223. As a result of the analysis, the facsimile image 400 is separated into the request information column 410, the memo column 420 and a memo column 430. The memo column 430 includes the memo column 431 and memo column 432.

By the processing from step S314 to step S320 shown in the example of the flowchart of FIG. 3, the undetermined edited information creating module 225 creates, from the request information column 410, memo column 420 and sealing column 430 within the facsimile image 400, a request information column 410D, memo column 420D and sealing column 430D which are undetermined edited data, respectively.

In step S43 et seq., the workflow consisting of step A 451, step B 452 and step C 453 will be executed.

In step S43, in step A 451, the workflow executing module 227 executes the job. In the setting job at this time, the step management module 226 supplies the request information column 410D to the workflow executing module 227 (processing in step S324 shown in the example of the flowchart of FIG. 3). In step S44, upon completion of the setting job in step A 451, the request information column 410D is deleted and the memo column 420D and sealing column 430D are set as the undetermined edited data.

Thereafter, likewise, in step B 452, after the setting job using the memo column 420D, the memo column 420D is deleted. In step C 453, after the setting job, the remaining sealing column 430D is used.

The edited data dealt with in the first processing example include an undetermined edited information table 600 and an edited information table 700.

Figure 6:
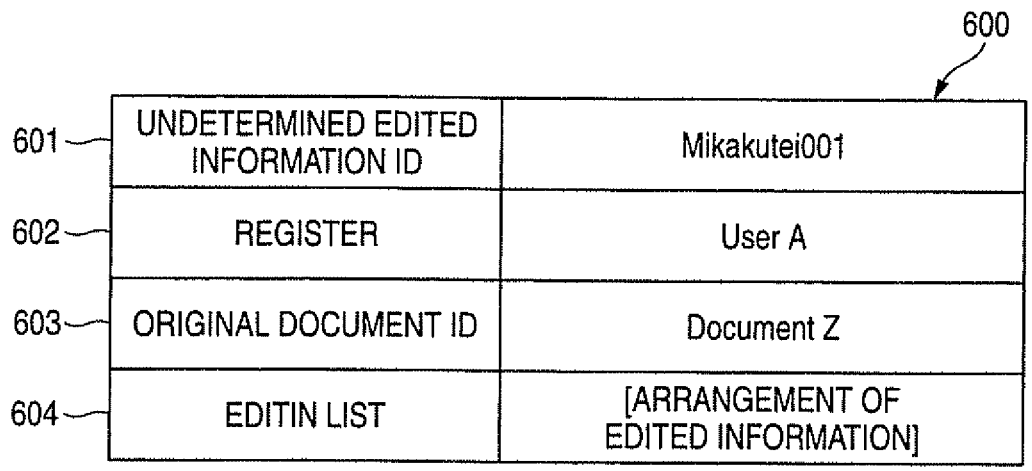
FIG. 6 is a view for explaining an exemplary data structure of an undetermined edited information table.

FIG. 6 is a view for explaining an exemplary data structure of the undetermined edited information table 600.

The undetermined edited information table 600 includes an undetermined edited information ID column 601, an registrant column 602, an original document ID column 603 and an edition list column 604.

The undetermined edited information ID column 601 stores an identifier which uniquely specifies the edited data extracted from the document 210.

The registrant column 602 stores a registrant name which specifies the person having registered the document 210.

The original document ID column 603 stores a document identifier which uniquely specifies the document 210. It can be extracted from the information image such as a barcode.

The edition list column 604 stores a list of edited information identifiers (pointers to the edited data). More specifically, they are the pointers to the edited information table 700 shown in the example of FIG. 7. The pointers to the edited data used in each of the steps in the workflow are deleted from the edition list column 604 after their use is completed.

Figure 7:
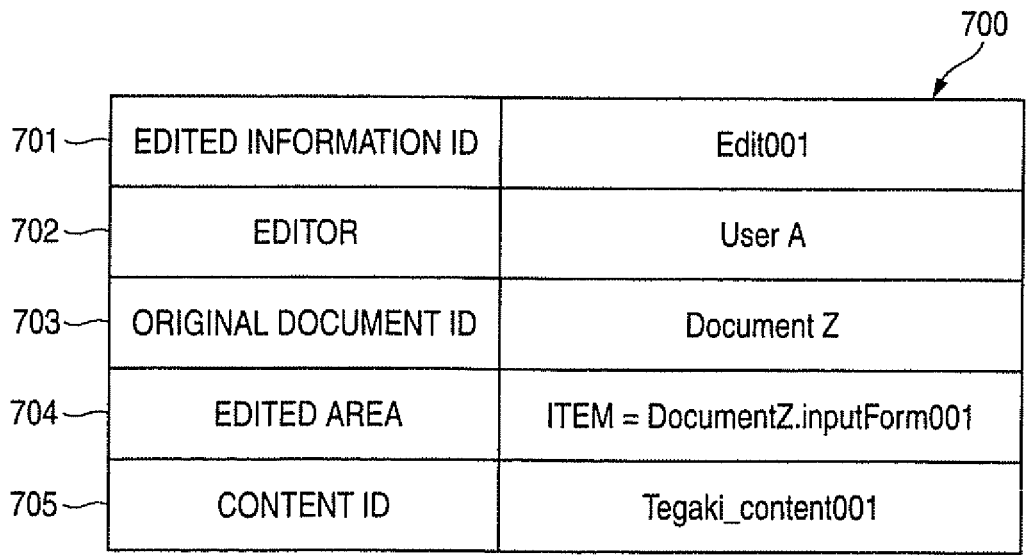
FIG. 7 is a view for explaining an exemplary data structure of an edited information table.

FIG. 7 is a view for explaining an exemplary data structure of the edited information table 700.

The edited information table 700 includes an edited information ID column 701, an editor column 702, an original document ID column 703, an edited area column 704 and an content ID column 705. The edited information table 700 is created for each item.

The edited information ID column 701 stores an edited information identifier which uniquely specifies the edited data.

The editor column 702 stores an editor name which specifies the person having registered the document 210. The editor name is detected by the handwriting analysis module 224.

The original source ID column 703 stores a document identifier which uniquely specifies the original document on which the pertinent edited data have been described.

The edited area column 704 stores the item in this document (item in which the pertinent data have been described).

The content ID column 705 stores an identifier which uniquely specifies the content (contents and data of the document itself) of the pertinent edited data.

The steps within the workflow dealt with in the first processing example and setting job within the pertinent step are managed using a step management table 800 and a job table 900.

Figure 8:
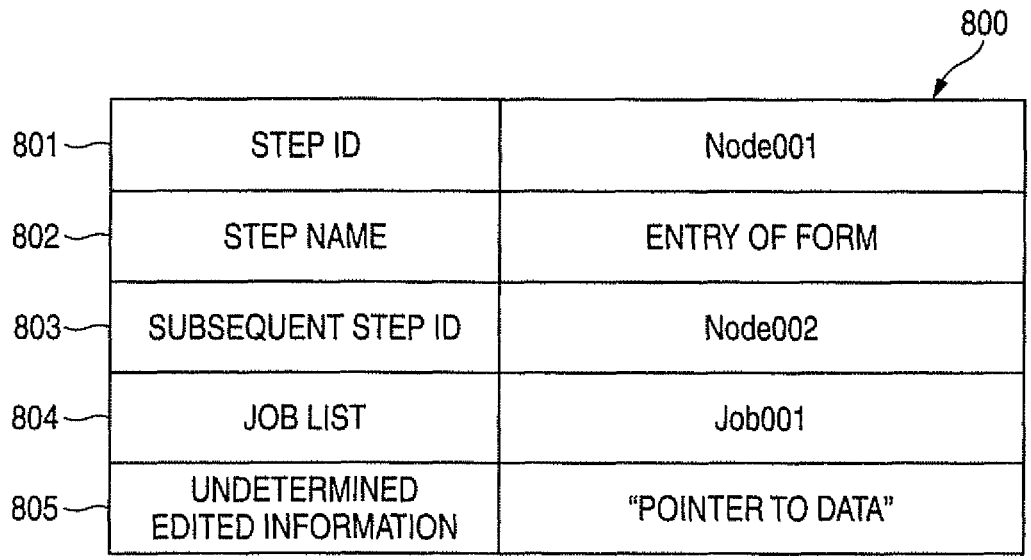
FIG. 8 is a view for explaining an exemplary data structure of a step management table.

FIG. 8 is a view for explaining an exemplary data structure of the step management table 800.

The step management table 800 includes a step ID column 801, an step name column 802, a subsequent step ID column 803, a job list column 804 and an undetermined edited information column 805.

The step ID column 801 stores an identifier which uniquely specifies the step within the workflow.

The step name column 802 stores a name of the pertinent step.

The subsequent step ID column 803 stores a step identifier of the subsequent step. In this way, the step management module 226 manages the order of the steps.

The job list column 804 stores a job identifier of the job in the pertinent step. More concretely, it is a pointer to the job table 900 in the example of FIG. 9.

The undetermined edited information column 805 stores a pointer to the edited data used in the workflow. More specifically, it is a pointer to the undetermined edited information table 600 shown in the example of FIG. 6.

Figure 9:
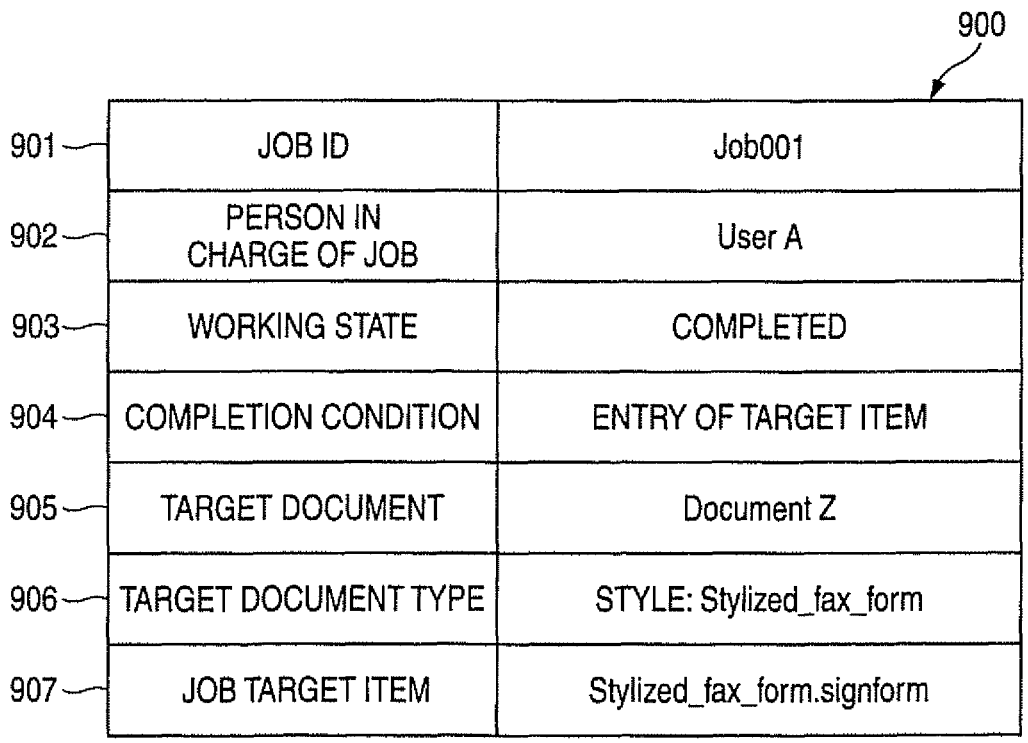
FIG. 9 is a view for explaining an exemplary data structure of a job table.

FIG. 9 is a view for explaining an exemplary data structure of the job table 900.

The job table 900 includes a job ID column 901, a person-in-charge-of-job column 902, a job state column 903, a completion condition column 904, a target document column 905, a target document type column 906 and a job target item column 907.

The job ID column 901 stores an identifier which uniquely specifies the job.

The person-in-charge-of-job column 902 stores a name of the person in charge of the pertinent job.

The job state column 903 stores completion or non-completion as the job state.

The completion condition column 904 store a condition by which it can be determined that the pertinent job has been completed. For example, the condition is e.g. entry of the target item and storage of the document.

The target document column 905 stores a document identifier of the document which is a target in the pertinent job.

The target document type column 906 stores a type of the target document (stylized or non-stylized).

The job target item column 907 stores a target item in the pertinent job (item to be set). It is e.g. a sealing column 431 which is an approval column (Stylized_fax_form.SignForm).

Figure 10:
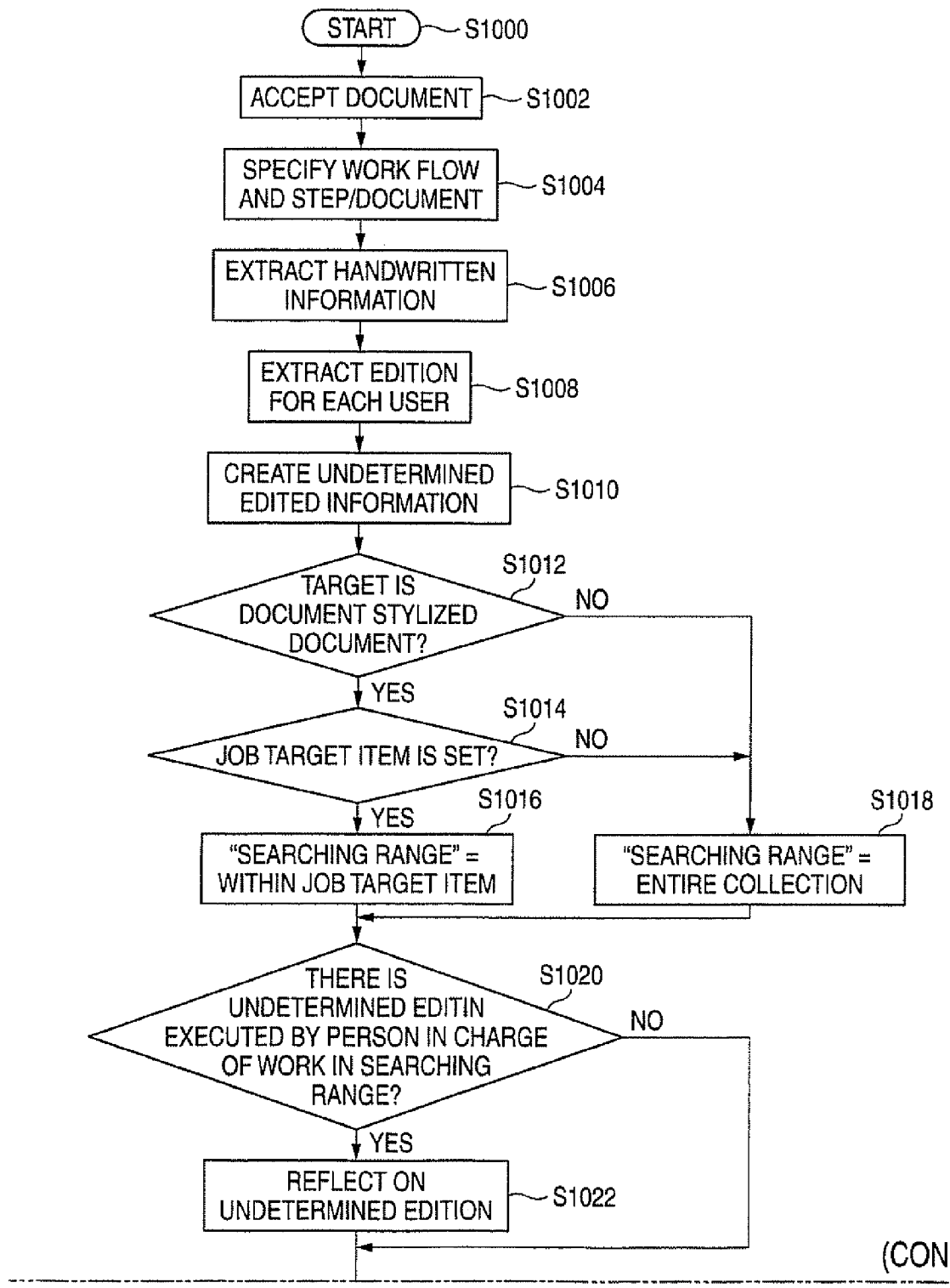
FIG. 10 is a flowchart of a second processing example according to this embodiment.

FIG. 10 is a flowchart of a second processing example according to this embodiment. Particularly, in the case where the document accepted is an image and the worker is specified by the handwriting analysis module 224, this flowchart intends to explain the processing in the setting job taken charge by the worker in the workflow. Incidentally, the same processing as the flowchart example in FIG. 3 will not be explained describing this effect.

In step S1002, the information acquisition module 110 accepts the handwritten document 211 or facsimile image 213.

Step S1004 is the same as step S304.

In step S1006, the image analysis module 223 extracts handwriting information, i.e., extracts a handwritten image described on the pertinent document.

In step S1008, the handwriting analysis module 224 detects the person having described the handwritten image extracted by step S1006 (worker having executed the edition). The data extracting module 222 extracts the edited data for each worker, and further extracts a document identifier from the image information such as the bar code within the image.

In step S1010, the undetermined edited information creating module 225 creates undetermined edited information which is the set information on the basis of the edited data extracted for each worker in step S1008.

The steps from step S1012 to step S1018 are the same as those from step S314 to step S320.

In the processing from step S1020 to step S1034, under the control by the step management module 226, the workflow executing module 227 executes the step within the workflow. This execution includes setting the set information.

In step S1020, the step management module 226 determines whether or not there are the undetermined edited data executed by the person in charge of the job (who is a worker in the workflow and also a person having described a handwritten image on the image accepted in step S1002) in the searching range defined in step S1016 or step S1018. If there are the undetermined edited data in the searching range, the processing proceeds to step S1022. If not, the processing proceeds to step S1024.

Step S1022 is the same as step S324.

In step S1024, the step management module 226 determines whether or not there are the undetermined edited data executed by the person who could not be specified as the worker (where the handwriting analysis module 224 could not specify the worker) in the searching range in step S1016 or step S1018. If there are the undetermined edited data, the processing proceeds to step S1026. If not, the processing proceeds to step S1028.

In step S1026, the user management module 228 inquires of the worker in the workflow through the UI creating module 232 whether or not the edited data may be set. If there is an answer that the edited data should not be set, the information to be set is acquired by the operation by the worker.

Step S1028 is the same as step S324.

The steps from S1030 to S1034 are the same as the steps from S326 to S330.

Figure 11:
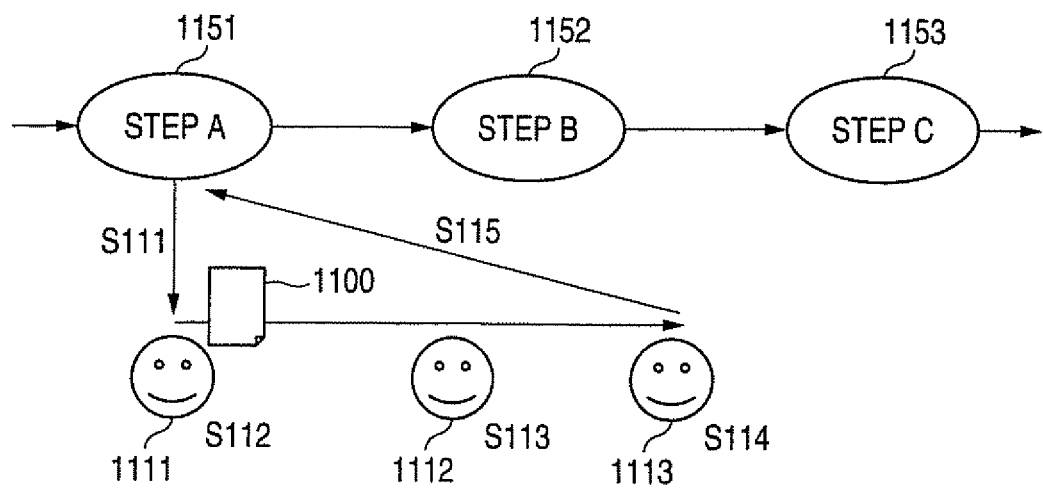
FIG. 11 is a view for explaining an example of the workflow in the second processing example.

FIG. 11 is a view for explaining an example of the workflow in the second processing example. This example of the workflow includes step A 1151, step B 1152 and step C 1153. The workers in charge are a worker 1111 in step A 1151, a worker 1112 step B 1152 and a worker 1113 step C 1153, respectively.

In step S111, in executing the job in step A 1151, a document 1100 to be processed is printed. On this document, any description is not still made.

In step S112, the worker 1111 who is the worker in step A 1151 receives this document and makes a description on the document by handwriting.

In step S113, the worker 1112 who is the worker in step A 1152 receives this document and further makes a description on the document by handwriting.

In step S114, the worker 1113 who is the worker in step C 1153 receives this document and makes an approval (signature or sealing) on the document.

In step S115, the data accepting module 221 accepts the document subjected to the processing from step S112 to S114 as an image read by the scanner or transmitted via the facsimile. According to the example of the workflow shown in FIG. 10, the job of setting the edited data is executed in step A 1151, step B 1152 and step C 1153. Namely, in step A1151, the information described in step S112 is set; in step B1152, the information described in step S113 is set; and in step C1153, the information described in step S114 is set (approval).

Figure 12:
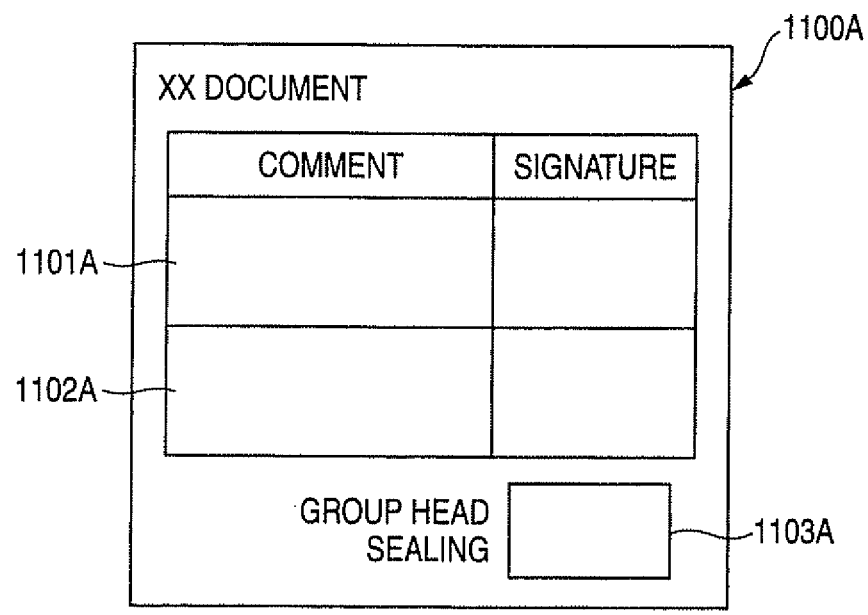
FIG. 12 is a view for explaining an exemplary document before job is started.

FIG. 12 is a view for explaining the document printed in step S111, i.e. a document 1100 before the job is started.

A document 1100A includes a set item column 1101A, a set item column 1102A and a set item column (approval) 1103A. It is of course that each column is blank.

Figure 13:
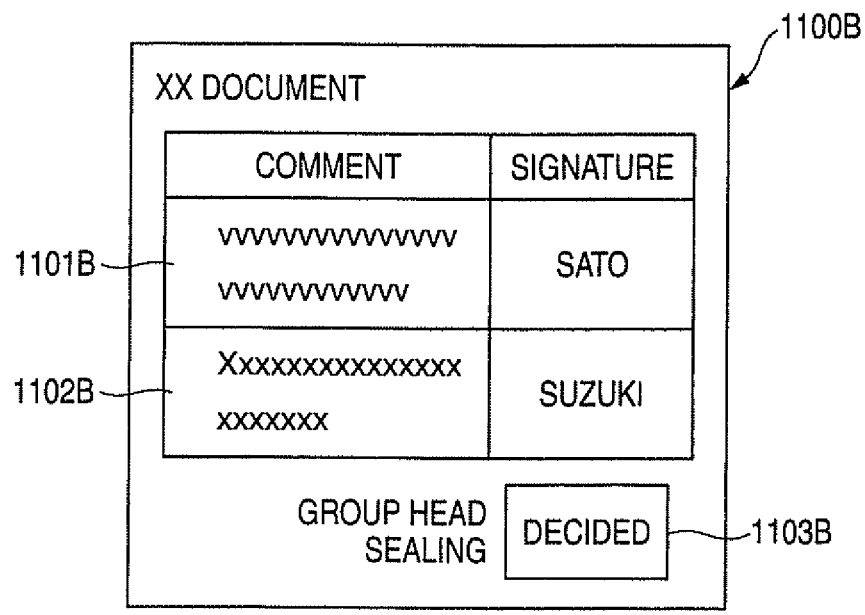
FIG. 13 is a view for explaining an example of the image information accepted.

FIG. 13 is a view for explaining an example of the image information of a document 1000B accepted in step S115.

For example, the set item column 1101B is described by the worker 1111; the set item column 1102B is described by the worker 1112; and the set item column (approval) 1103B is put a seal by the worker 1113.

Figure 14:
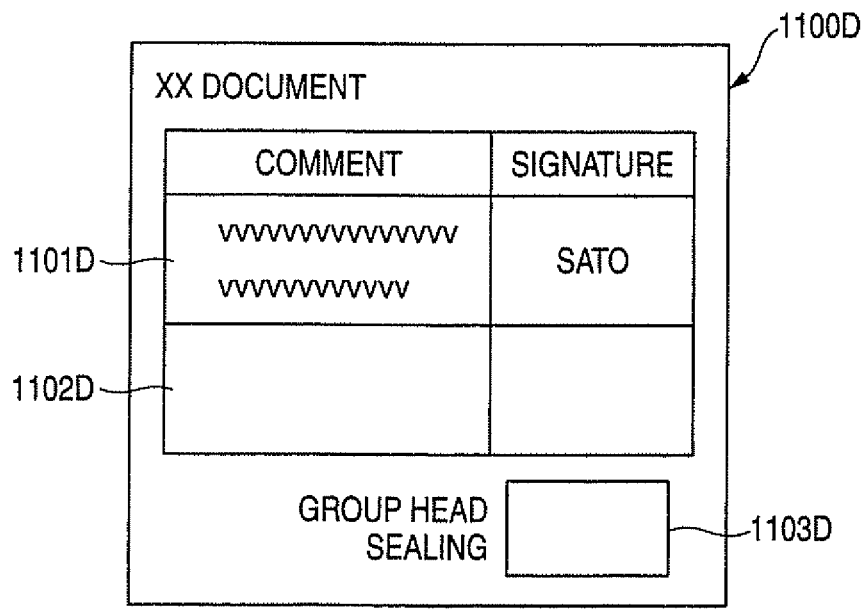
FIG. 14 is a view for explaining an example of the electronic information in the state before the setting job in step B is started.

FIG. 14 is a view for explaining an example of the electronic information in the state before the setting job in step B 1152 is started (the state after the setting job in step A 1151 has been completed).

A document 1100D includes a set item column 1101D, a set item column 1102D and a set item column (approval) 1103D. Namely, a description on the set item column 1101B in step S112 is reflected as the set item column 1101D. Incidentally, in the setting job in step B 1152, although the information set in the previous step like the set item column 1101D, this information cannot be edited in the setting job in step B 1152.

The edited data to be dealt with in the second processing example includes an undetermined edited information table 1500 and an edited information table 1600. If they are the same as the undetermined edited information table 600 and edited information table 700 dealt with in the first processing example, they will not be explained describing this effect.

FIG. 15 is a view for explaining an exemplary data structure of the undetermined edited information table 1500.

The undetermined edited information table 1500 includes an undetermined edited information ID column 1501, a registrant column 1502, an original document ID column 1503 and an edition list column 1504. Each column is the same as each column in the undetermined edited information table 600.

FIG. 16 is a view for explaining an exemplary data structure of the edited information table 1600.

The edited information table 1600 includes an edited information ID column 1601, an editor column 1602, an original document ID column 1603, a page column 1604, a coordinate-width-length column 1605 and a content ID column 1606. The edited information table 1600 is different from the edited information table 700 in that it has the page column 1604 and coordinate-width-length column 1605 in place of the edited area column 704.

The page column 1604 stores a page where there is the pertinent item of the target document.

The coordinate-width-length column 1605 stores an area where there is the pertinent item with the page. In short, by the page column 1604 and coordinate-width-length column 1605, the pertinent item is specified from the document which is the image.

The steps within the workflow dealt with in the second processing example and setting job within the pertinent step are managed using a step management table 1700 and a job table 1800.

FIG. 17 is a view for explaining an exemplary data structure of the step management table 1700.

The step management table 1700 includes a step ID column 1701, an step name column 1702, a subsequent step ID column 1703, a job list column 1704 and an undetermined edited information column 1705. Each column in the step management table 1700 is the same as each in the step management table 800.

FIG. 18 is a view for explaining an exemplary data structure of the job table 1800.

The job table 1800 includes a job ID column 1801, a person-in-charge-of-job column 1802, a job state column 1803, a completion condition column 1804, a target document column 1805, a target document type column 1806 and a job target item column 1807. Each of the job table 1800 is the same as each of the job table 900.

Figure 19:
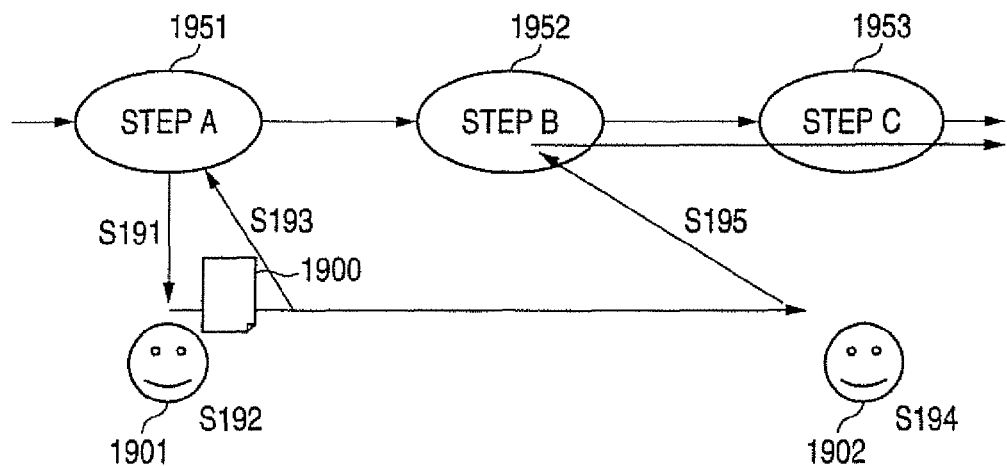
FIG. 19 is a view for explaining another processing example of the workflow.

FIG. 19 is a view for explaining another processing example of the workflow.

Further, in this embodiment, in addition to the relationship between the workflow shown in FIG. 4 or 11 and the processing of the document in the workflow, such a relationship as shown in FIG. 19 may be adopted.

This example of the workflow includes step A 1951, step B 1952 and step C 1953. The workers in charge are a worker 1901 in step A 1951 and a worker 1902 in step C 1953, respectively. The worker 1901 and the worker 1902 are nearby so that they can hand over a paper document therebetween. However, the worker of step B1952 is at a place farther from the worker 1901 and others so that the processing of step B 1952 by the workflow executing module 227 will be executed via a communication line.

In step S191, in executing the job in step A 1951, the document 1900 to be processed is printed. On this document, any description is not still made.

In step S192, the worker 1901 who is the worker in step A 1951 receives this document and makes a description on the document by handwriting.

In step S193, the data accepting module 221 accepts the document 1900 subjected to the processing in step S192 as an image read by the scanner or transmitted via the facsimile. According to the example of the workflow shown in FIG. 10, the job of setting the edited data is executed in step A 1951. On the other hand, the worker 1901 hands over the handwritten document 1900 to the worker 1902.

In step S194, the worker 1902 makes a handwritten description on the document 1900 received.

In step S195, after the setting job has been executed in step B 1952, the data accepting module 221 accepts the document 1900 subjected to the processing in step S194 as an image read by the scanner or transmitted via the facsimile. According to the example of the workflow shown in FIG. 10, the job of setting the edited data is executed in step C 1953.

Namely, in step B 1952, the setting job is executed without the description being made on the paper document, whereas in step A 1951 and step C 1953, after the description has been made on the paper document, the description is read to execute the setting job.

Figure 20:
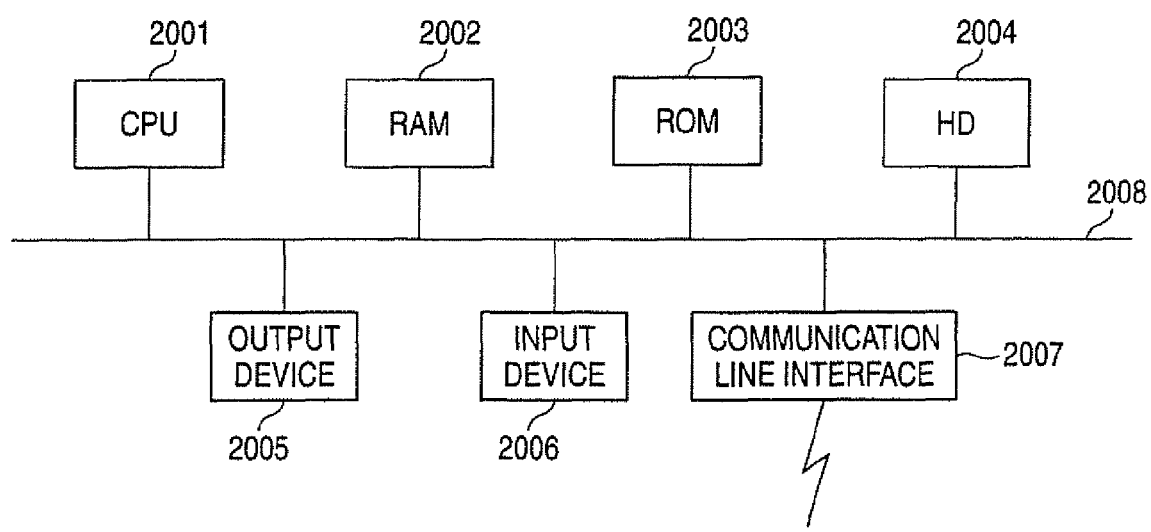
FIG. 20 is a block diagram showing an exemplary hardware configuration of a computer which realizes an embodiment of this invention.

Additionally, the hardware configuration of the computer for executing a program according to this embodiment is a general computer, as illustrated in FIG. 20, more specifically a computer which is used as a personal computer or server. The computer includes a CPU 2001 (used as an arithmetic unit in this embodiment), which executes the program such as the information acquisition module 110, using state setting module 120, using state changing module 130, data extracting module 222, undetermined edited information creating module 225, step management module 226 and workflow executing module 227; a RAM 2002 which stores the program and data; a ROM 2003 which stores the program and others for starting the computer; an HD 2004 serving as an auxiliary device (e.g. a hard disk can be used); an inputting device 2006 such as a keyboard or mouse for inputting data; an inputting device 2005 such as a CRT or liquid crystal display; a communication line interface 2007 to be connected to a communication network (e.g. a network interface card can be used); and a bus 2008 for connecting these components to execute the exchange of data thereamong. A plurality of such computers may be connected to one another by the network.

The embodiment according to a computer program can be realized in such a manner that the computer program or software is read in the system of the hardware configuration and the software is cooperated with hardware resources.

The hardware configuration shown in FIG. 20 is only a typical example thereof, and should not be limited to such configuration but may be any configuration as long as it can executed the modules explained with reference to this embodiment. For example, some modules may be constructed by dedicated hardware (e.g. ASIC) and some modules may be located within an external system and connected to one another by the communication line. Further, a plurality of systems as shown in FIG. 20 may be connected to one another by the communication line to operate cooperatively with one another. Further, particularly, this embodiment may incorporate not only the personal computer but also an information household electric appliance, a copier, a facsimile, a scanner, a printer, a composite machine (an image processing device having any two functions of the scanner, printer, copier, facsimile, etc.).

The program as described above may be stored in a recording medium. Otherwise, it may be provided via a communicating means. In this case, the program as described above may be taken as an invention of "a computer-readable recording medium with the program recorded".

The "computer-readable recording medium with the program recorded" refers to a computer-readable recording medium with the program recorded which is used for installation, execution, circulation, etc. of the program.

The recording medium includes a "DVD-R, DVD-RW, DVD-RAM, etc." which is a digital versatile disk (DVD) and a standard worked out by the DVD forum; a "DVD+R, DVD+RW, etc." which is a standard by the DVD+RW forum; a compact disk (CD) inclusive of a read-only-memory (CD-ROM), a CD-recordable (CD-R), a CD-rewritable (CD-RW), etc.; and a blue-ray disk (Blue-ray Disk), a magneto-optic disk (MO), a flexible disk (FD), a magnetic tape, a hard disk, a read-only-memory (ROM), an electrically erasable and rewritable read-only-memory (EEPROM), a flash memory, a random-access-memory (RAM).

The above program or its portion recorded in the recording medium may be held or circulated. Further, by communication, it may be also transmitted through a cable network used in e.g. a local area network (LAN), a metropolitan area network (MAN), a wide area network (WAN), an internet, an intranet or an extranet; a wireless communication network; or a transmitting medium consisting of these networks. The program may be transferred on a carrier wave.

Further, the above program may be a part of another program, or may be recorded together with another program on the recording medium. The program may be recorded divisionally in a plurality of recording media. Further, the program may be recorded in any manner such as compression or encryption as long as it can be restored.

The foregoing description of the embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention defined by the following claims and their equivalents.

What is claimed is:

1. A job control method comprising:
 accepting electronic information including a plurality of job items, set information including a first set information set to a first job item by a first worker, and a second set information set to a second job item by a second worker;
 acquiring, from the electronic information, the set information set for each of the plurality of job items;
 storing the set information correlated with a user who is allowed to use the set information;
 determining if the set information is image information;
 if the set information is image information, analyzing the image information and extracting a region that is revised or edited;
 if the extracted region includes a column of signatures, recognizing a signer of a signature in the column of signatures;
 when the signer is recognized and agrees with the first worker of the first job item or the second worker of the second job item, setting the set information for a usable state in a job item of the plurality of job items whose executing procedure is preset; and changing the set information in the first job item, into an unusable state in the second job item to be executed after the first job item is executed, by removing the set information or by adding information indicating the unusable state to the set information, wherein when the signer is recognized and agrees with the first worker of the first job item, the set information is set for a usable state by storing the set information in the first job item for the first worker, and when the signer is recognized and agrees with the second worker of the second job item, the set information is set for a usable state by storing the set information in the second job item of the second worker.

2. The job control method as claimed in claim 1, further comprising:

storing a series-of-jobs identifying information that identifies a series of jobs initiated according to the plurality of job items whose executing procedure are preset, wherein the electronic information contains the series-of-jobs identifying information, and the setting step sets the set information for a usable state in the job within a job item in the series of jobs specified by the series-of-jobs identifying information contained in the electronic information.

3. A non-transitory computer readable medium storing a program causing a computer to execute a process for performing job control processing, the process comprising:

accepting electronic information including a plurality of job items, set information including a first set information set to a first job item by a first worker, and a second set information set to a second job item by a second worker;

acquiring, from the electronic information, the set information set for each of the plurality of job items;

storing the set information correlated with a user who is allowed to use the set information;

determining if the set information is image information;

if the set information is image information, analyzing the image information and extracting a region that is revised or edited;

if the extracted region includes a column of signatures, recognizing a signer of a signature in the column of signatures;

when the signer is recognized and agrees with the first worker of the first job item or the second worker of the second job item, setting the set information for a usable state in a job item of the plurality of job items whose executing procedure is preset; and changing the set information in the first job item, into an unusable state in the second job item to be executed after the first job item is executed, by removing the set information or by adding information indicating the unusable state to the set information, wherein when the signer is recognized and agrees with the first worker of the first job item, the set information is set for a usable state by storing the set information in the first job item for the first worker, and when the signer is recognized agrees with the second worker of the second job item, the set information is set for a usable state by storing the set information in the second job item of the second worker.

4. The non-transitory computer readable medium as claimed in claim 3, further comprising:

storing a series-of-jobs identifying information that identifies a series of jobs initiated according to the plurality of job items whose executing procedure are preset, wherein the electronic information contains the series-of-jobs identifying information, and the setting step sets the set information for a usable state in the job within a job item in the series of jobs specified by the series-of-jobs identifying information contained in the electronic information.

5. The non-transitory computer readable medium as claimed in claim 3, further comprising:

if the electronic information is image information and when a signature or a sealing stamp is extracted as the set information set for each set item, recognizing a person corresponding to the signature or sealing stamp, wherein when the person is recognized agrees with the first worker of the first job item or the second worker of the second job item, setting the set information, which is a target of recognition, for the usable state in a job within the job item.

6. A job control system comprising a computer processor and a memory, the computer processor and the memory adapted to function as:

an electronic information acceptance unit that accepts electronic information including a plurality of job items, set information including a first set information set to a first job item by a first worker, and a second set information set to a second job item by a second worker;

a set information acquisition unit that acquires, from the electronic information, the set information set for each of the plurality of job items;

a storing unit that stores the set information correlated with a user who is allowed to use the set information;

an editing region extraction unit that, when the set information is image information, analyzes the image information and extracts a region that is revised or edited;

a recognition unit that, when the extracted region includes a column of signatures, recognizes a signer of a signature in the column of signatures;

an using state setting unit that, when the signer is recognized and agrees with the first worker of the first job item or the second worker of the second job item, sets the set information for an usable state in a job item of the plurality of job items whose executing procedure is preset; and an using state changing unit that changes the set information in the first job item, into an unusable state in the second job item to be executed after the first job item is executed, by removing the set information from the storing unit or by adding information indicating the unusable state to the set information, wherein when the signer is recognized by the recognition unit and agrees with the first worker of the first job item, the using state setting unit sets the set information for a usable state by storing the set information, which is acquired in the set information acquisition unit, in the first job item for the first worker, and when the signer is recognized by the recognition unit and agrees with the second worker of the second job item, the using state setting unit sets the set information for a usable state by storing the set information, which is acquired in the set information acquisition unit, in the second job item of the second worker.

7. The job control system as claimed in claim 6, further comprising:

an image information receiving unit that receives the image information by facsimile, wherein
the electronic information is the image information received by facsimile.

* * * * *